United States Patent [19]

Kalfsbeek et al.

[11] 3,787,646

[45] Jan. 22, 1974

[54] DIAL TELEPHONE LOCK

[75] Inventors: James S. Kalfsbeek, College City; Peter C. Kalfsbeek; Robert S. Goodrich, both of El Segundo, all of Calif.

[73] Assignees: James S. Kalfsbeek, College City; Peter C. Kalfsbeek, Williams, both of, Calif.

[22] Filed: Apr. 18, 1972

[21] Appl. No.: 245,067

[52] U.S. Cl. .......... 179/189 D
[51] Int. Cl. .......... H04m 1/66
[58] Field of Search .......... 179/189 D

[56] References Cited

UNITED STATES PATENTS 2,469,806 5/1949 Zion .......... 179/189 D

FOREIGN PATENTS OR APPLICATIONS 483,275 7/1953 Italy .......... 179/189 D

*Primary Examiner*—Thomas W. Brown
*Attorney, Agent, or Firm*—Stephen S. Townsend et al.

[57] ABSTRACT

A dial telephone locking device having a shaft extending through a combination lock mechanism. One end of the shaft has an elongate foot for engagement in a hole in the dial. The shaft is transversely movable in the combination lock when the lock is open, but such movement is prohibited when the lock is locked. Thus, the foot may be received in the hole in the dial when the lock is open, and the shaft thereafter drawn inwardly through the lock body to center the foot in abutting engagement beneath the hole with the lock body abutting the other side of the dial. The lock protrudes above the telephone dial and thereby prevents rotation of the dial beyond the finger stop.

11 Claims, 7 Drawing Figures

DIAL TELEPHONE LOCK

This invention relates to locking devices for telephones, and more particularly, to a combination lock for dial telephones.

In many situations, it is desirable to have a telephone available to receive calls yet inhibit or prevent people from making calls. With dial telephones, this may readily be accomplished by providing a lock which engages one of the finger holes of the telephone dial to prevent rotation thereof. U. S. Pat. Nos. 1,771,800, 1,807,065, 2,397,954, and 2,469,806 are illustrative of prior art dial telephone locks of this general type. All of the prior art dial telephone locks of this type employ a key-type lock mechanism which suffers from the drawback of requiring a key. Specifically, the key may readily be lost or misplaced, rendering authorized use or removal of the lock difficult or impossible. Moreover, prior art dial telephone locks generally are not suited for use with all of the various types of dial telephones. Particularly, applicant has found that there is substantial variation in the dial thickness among the various types and manufacturers of telephones, so that a dial telephone lock should be readily adaptable for use with dials of varying thickness.

Moreover, an acceptable dial telephone lock should be compact, simple to operate and easily mounted and dismounted from the telephone. It is desirable that the lock be relatively inexpensive and of simple construction, and be reasonably attractive.

According to the present invention, a dial telephone locking device is provided employing a combination lock mechanism having a shaft extending through the lock with an elongate foot on one for engagement in a hole in the telephone dial. The other end of the shaft is provided with a finger grip for moving the shaft transversely into and out of the lock. The foot is dimensioned to be received in the hole in the dial when the lock is open, and the shaft is thereafter drawn inwardly into the lock body by the grip to center the foot in abutting engagement beneath the hole with the lock body abutting the other side of the dial, to prevent unauthorized removal of the lock. The lock protrudes above the telephone dial and thereby prevents rotation of the dial beyond the finger stop.

Accordingly, it is an object of the present invention to provide a telephone dial lock employing a combination lock mechanism.

Another object of the present invention is to provide a telephone dial lock employing a shaft transversely movable into the lock body and having a foot adapted for engagement in a hole in the telephone dial.

Yet another object of the present invention is to provide a telephone dial lock adaptable for use with telephone dials of varying thickness.

The telephone dial lock according to the present invention is advantageous in that no key is employed, thereby eliminating the unpleasant consequences of loss of the key of prior art locking devices. Moreover, the telephone dial lock according to the present invention is of relatively simple and inexpensive construction and is easily mounted and dismounted from the telephone.

These and other objects, featuring advantages of the present invention will be more readily apparent from the following detailed description, wherein reference made to the drawings, in which.

Figure 1:
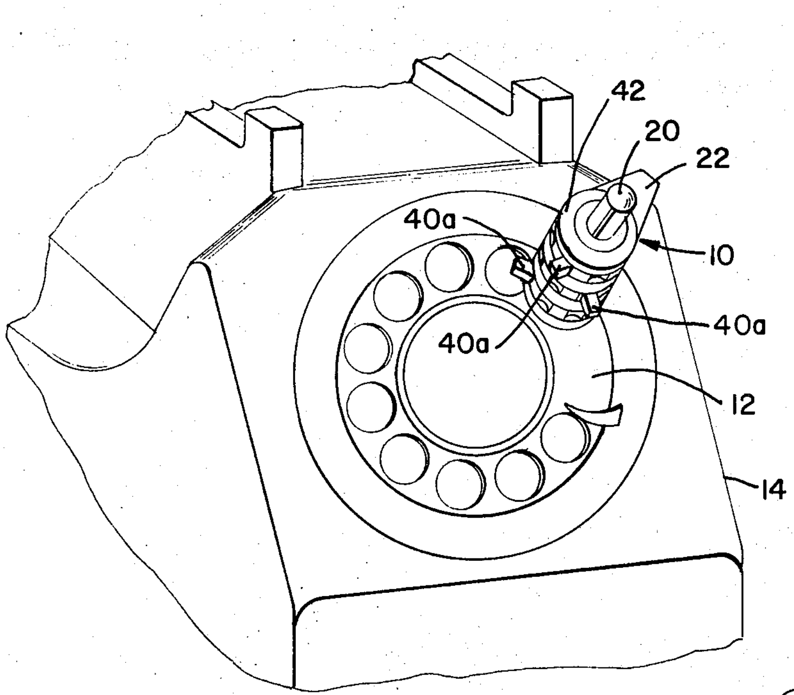
FIG. 1 is a perspective view of a dial telephone having the dial telephone lock according to the present invention engaged therein.

Referring initially to FIG. 1, there is shown a dial telephone lock 10 according to the present invention, inserted in the dial 12 of a telephone 14. Dial telephone lock 10 generally comprises a shaft 20 extending through a combination lock body 22. The upper portion of shaft 20 extends outwardly from lock body 22 and provides a finger grip portion for manual manipulation of the shaft with respect to the lock body. The other end of shaft 20 extends from the other side of combination lock body 22 and terminates in a plate or foot 30.

Figures 2, 3, 4:
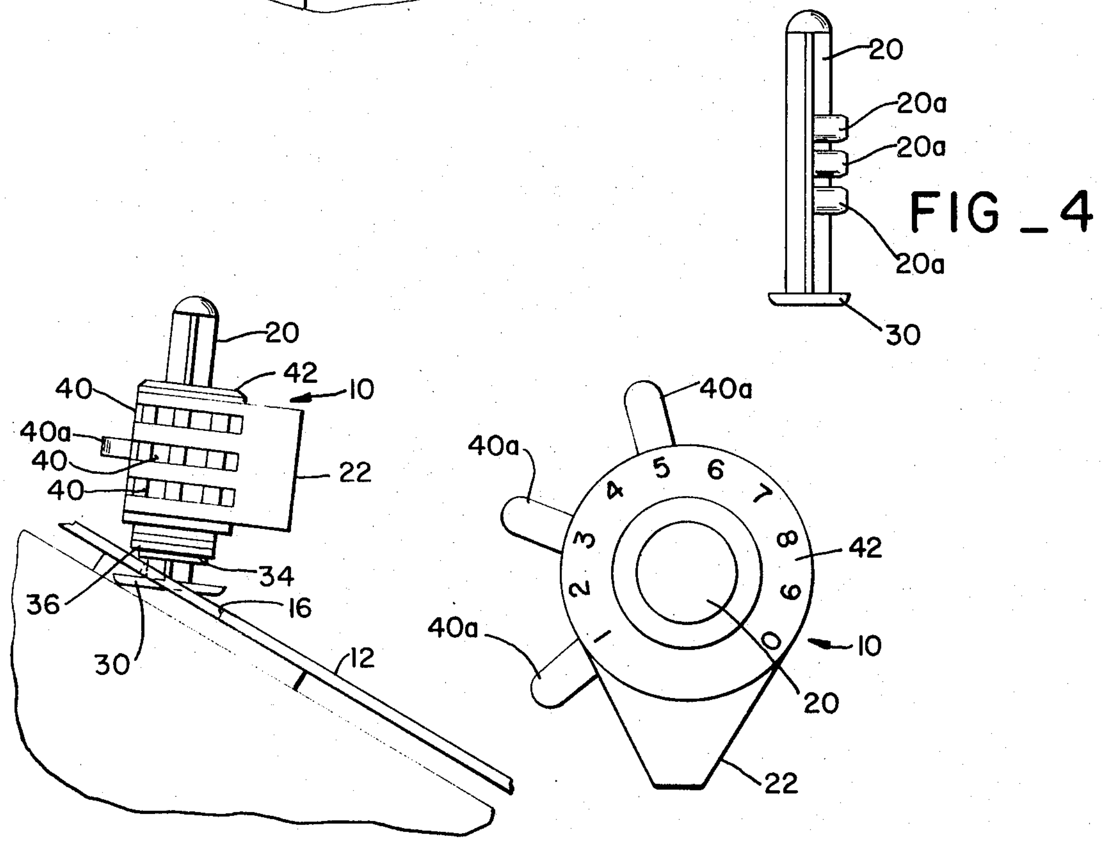
FIG. 2 is a side view of the apparatus depicted in FIG. 1, showing the telephone dial lock according to the present invention being introduced into the opening in the dial.
FIG. 3 is an end view of the apparatus depicted in FIG. 1.
FIG. 4 is a side elevation of the shaft portion of the apparatus depicted in FIG. 1.
Figure 5:
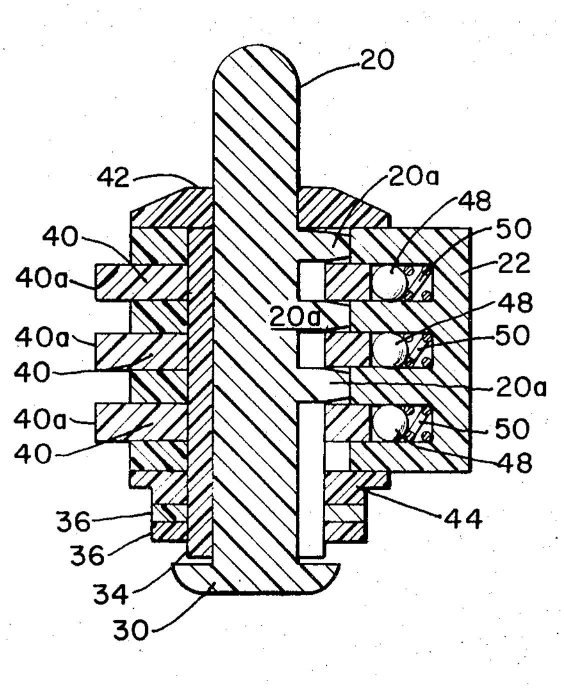
FIG. 5 is a side cross sectional view of the apparatus depicted in FIG. 1 in the locked mode.
Figure 6:
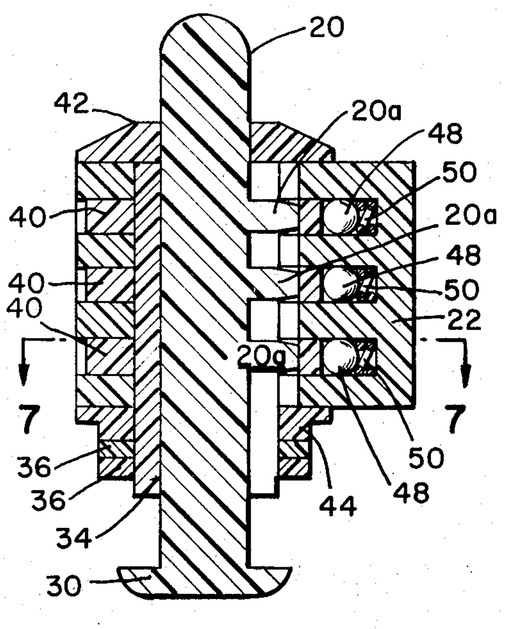
FIG. 6 is a side cross sectional view of the apparatus depicted in FIG. 1 in the open mode.

Referring to FIG. 2, wherein the lock 10 is depicted in the process of insertion into a hole 16 in dial 12, the plate or foot 30 of shaft 20 has one dimension smaller than the other, and may be rectangular, eliptical or the like. The significant factor is that the greater dimension is greater than the diameter of the opening 16 in dial 12, so that when the plate 30 is parallel to the surface of the dial, the ends of the plate abut against the lower surface of the dial about the opening. The greater dimension is not so long as to prevent the entering of the plate through the opening in the dial by tipping the plate at an angle to the surface of the dial, as depicted in FIG. 2. The plate is centrally located on the shaft 20, so that it extends equidistantly from the center of the shaft along the axis in the greater direction. Usually, the length of the plate 30 will be about one thirty-second of an inch to three thirty-seconds of an inch greater greater than the diameter of the opening in the dial. The plate 30 need only be of sufficient thickness to provide the desired mechanical strength.

As will be described in greater detail hereinafter, shaft 20 is slidably mounted within lock body 22, when the lock mechanism is in its open position. Conversely, when the lock mechanism is locked, sliding movement of shaft 20 and lock body 22 is prohibited. Thus, after introducing the plate 30 into the opening 16 in dial 12, the plate is pulled up flush with the under surface of the dial, the ends of the plate 30 abutting the lower surface of the dial. With the combination lock in the open position, the upper end or grip of shaft 20 and lock body 22 is manually manipulated so as to urge lock body 22 downwardly towards the upper surface of the dial. The combination lock mechanism may then be locked, to prevent sliding movement of the lock body 22 on the shaft 20, and to thereby cause the lock to be firmly retained in hole 16 of dial 12. To this end, the lower end of lock body 22 includes a cylinder portion 34 having a diameter slightly smaller than the hole 16 in dial 12. Thus, cylinder portion 34 will seat in the hole 16 of dial 12, so as to maintain plate or foot 30 in the desired position beneath the hole 16.

Applicant has found that there is substantial variation in the thickness of telephone dials. Specifically, certain telephone dials are of metal construction and are quite thin, whereas others are formed of plastic and are somewhat thicker. In order to permit tight engagement of the lock in telephone dials of different thicknesses, cylinder 34 is provided with a pair of flatfaced adapter rings 36 which function to shorten the height of cylinder 34 to that of the thickness of the dial 12. With a metal dial, the two rings 36 function to shorten the height of cylinder portion 34 so that only the end portion thereof enters the metal dial. Thus, cylinder 34 will not extend significantly below the lower surface of the metal dial, to insure tight mating engagement of the lock in the dial. With other telephones, such as those employing thicker plastic dials, it may be necessary to remove one or two of the rings 36. In this way, the cylinder portion 34 is modified so that it fits snugly in the dial opening and does not permit a significant gap to exist between the plate 30 and the lower surface of the dial. Therefore, the lock may be securely mounted in dials of varying thickness merely by removing or adding one or more of the rings 36, the object being to select an appropriate thickness for cylinder 34 so as to prevent excessive translational movement of the plate 30 with respect to the hole in the dial.

Referring now to FIGS. 3 through 7, the combination lock mechanism of the dial telephone lock according to the present invention will now be described in detail. Lock body 22 includes three slots carrying three tumbler rings 40 in spaced apart parallel relation. Each of the tumbler rings 40 includes a projecting tab 40*a* which functions to permit the tumbler rings 40 to be manually rotationally manipulated with respect to the lock body 22. Thus, each of the rotational positions of the tumbler rings 40 may be associated with a particular number of other indicia. To this end, lock body 22 includes an end plate 42 having a plurality of numerals or other indicia thereon (as best seen in FIG. 3). As is apparent therefrom, each of the rotational positions of tumbler rings 40 may then be readily associated with a particular numeral or other indicia adjacent the projecting tab 40a. Thus, the combination lock mechanism may have associated therewith a sequence of numbers constituting a combination for the telephone locking device 10.

Figure 7:
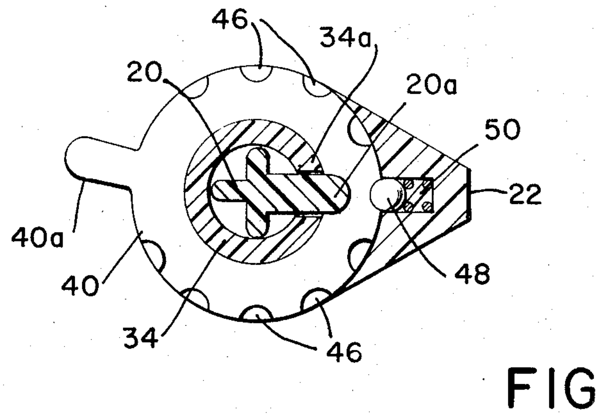
FIG. 7 is a sectional view taken along the line 7—7 in FIG. 6.

As best seen in FIG. 7, each of the tumbler rings 40 includes a generally cylindrical central opening having a notch therein. Cylinder 34 is of generally c-shaped cross section and extends inwardly into the lock body 22. Cylinder 34 has a diameter slightly smaller than the bore of tumbler rings 40, so that tumbler rings 40 rotate on cylinder 34, which acts as a bearing therefor.

Shaft 20, as best seen in FIGS. 4 and 7, is dimensioned to slide within the inner bore of cylinder 34. Specifically, shaft 20 is depicted as having an *x* cross section, although alternative cross sectional configurations may be readily employed. Shaft 20 includes three protuberances 20*a* which extend into the slot in cylinder 34 for engagement with tumbler rings 40. Specifically, when the tumbler rings 40 are in the lock position, protuberances 20*a* will abut against the inner perimeter of the tumbler rings 40, thereby preventing sliding movement of shaft 20. However, when tumbler rings 40 are rotated to their open positions, the notches therein will be in alignment with the protuberances 20*a*, so that the protuberances may slide therethrough. Thus, sliding movement of shaft 20 will be permitted only when the combination lock is opened. Protuberances 20a and the slot in c-shaped cylinder 34 cooperate to prohibit rotational movement of shaft 20. Thus, shaft 20 is mounted for sliding movement only, and may be only so moved when the combination lock is opened.

Each of the tumbler rings 40 includes a plurality of recesses 46 about the perimeter thereof. Three ratchet spheres 48 are contained in lock body 22 and are urged against the perimeter of tumbler rings 40 by three springs 50. The notches 46 in the perimeter of the tumbler rings 40 will then, in cooperation with rachet spheres 48 and springs 50, provide a rachet action for the rotation of tumbler rings 40. This rachet action will tend to detent the tumbler rings in the various rotational positions, thereby more precisely defining each rotational position.

The lower end of lock body 22 includes an end plate 44 disposed about cylinder 34. The lower surface of end plate 44 functions to provide the mating surface for the telephone dial, in the absence of adapter rings 36. The upper surface of end plate 44 blocks the path of protuberances 20a of shaft 20, so as to prevent shaft 20 from being drawn completely out of the lock body.

The dial telephone combination lock 10 may be constructed of a variety of materials. According to the preferred embodiment of the present invention, all of the parts of the dial telephone lock, with the exception of rachet spheres 48 and springs 50, may be formed of molded plastic. The dial telephone lock may then be assembled employing adhesives, as required, to fabricate a compact, inexpensive and attractive combination lock.

In assembling the dial telephone combination lock according to the present invention, the springs 50 and rachet spheres 48 are introduced into the lock body 22, and the tumbler rings 40 are placed in the slots provided therefor. Cylinder 34 is inserted into the lock body 22 and tumbler rings 40 to retain the tumbler rings 40 in position. Shaft 20 may then be introduced into the bore of cylinder 34, and end plates 42 and 44 may then be adhesively attached to lock body 22 to essentially complete the construction. Of course, adapter rings 36 may be added to cylinder 34, as needed, to adapt the telephone lock for dials of varying thickness.

In operation, tumbler rings 40 are manually rotated via projections 40*a* to align the projections 40a with the numerical indicia on end plate 42 associated therewith. The grip end of shaft 20 is then manipulated to slide shaft 20 within lock body 22 and thereby urge plate 30 away from the lower end of the lock body.

Plate 30 is then introduced into the hole in the dial, by the tipping procedure depicted in FIG. 2. After the plate 30 is in position, the grip end of shaft 20 is manipulated to urge lock body 22 downwardly towards the dial, thereby engaging the lower end of cylinder 34 in the hole in the dial, with the lower surface of end plate 44, or adapter rings 36 if employed, abutting the upper surface of the dial. Tumbler rings 40 are then manually rotated to random positions so as to disturb the alignment of protuberances 20*a* with the notches in tumbler rings 40. In this manner, sliding movement of shaft 20 is now prohibited by the abuttment of protuberances 20*a* against the inner perimeter of tumbler rings 40.

Accordingly, the telephone dial lock 10 will be securely retained in the hole in the telephone dial. Since the dial lock 10 projects substantially above the dial, rotation of the dial will be prevented by the abutting of the dial lock 10 against the finger stop of the telephone. In order to remove the dial telephone lock 10 from the dial, the procedures described above need merely be reversed.

Accordingly, the present invention provides a simple, convenient device for locking a telephone dial. The device is adaptable to a wide variety of different telephones having dials of varying thickness and is conveniently a combination lock, thereby avoiding the need for a key. The lock can be made of convenient size employing a three number combination and can be attractively styled. Of course, the length of the combination depends solely upon the number of tumbler rings 40 and associated protuberances 20*a* provided. Therefore, the dial telephone lock according to the present invention may readily be adapted for applications of greater or lesser security, merely by providing additional or fewer tumbler rings. Furthermore, the moving parts of the lock mechanism are few and are not generally subject to interference or easy destruction.

While a preferred embodiment of the present invention has been shown and described in detail, it is apparent that adaptations and modifications may occur to those skilled in the art. Such adaptations and modifications are specifically within the spirit and scope of the present invention, as set forth in the claims.

What is claimed is:

1. A dial telephone lock for mounting in one opening of a telephone dial comprising a shaft having an elongate foot at one end dimensioned to be received in said opening, said foot having a large dimension slightly greater than the diameter of said opening and lock means disposed about said shaft, said lock means having locked and unlocked states, in said unlocked state said lock means being axially movable on said shaft and in said locked state said lock means being fixed on said shaft centering said foot in said opening.

2. Apparatus according to claim 1 wherein said lock means includes a cylindrical end portion receivable in said opening for centering said shaft in said opening.

3. Apparatus according to claim 1 further comprising at least one ring having an inner diameter equal to the outer diameter of said cylindrical portion for varying the extent of the cylindrical portion able to enter said opening in said dial.

4. Apparatus according to claim 1 wherein said lock means comprises combination lock means.

5. Apparatus according to claim 4 wherein said shaft includes a plurality of protuberances and wherein said combination lock means comprises a plurality of tumbler rings, equal to the number of said protuberances, each of said rings having a notch, said notches being aligned with said protuberances in said unlocked state to permit axial movement of said lock means relative to said shaft and said notches being misaligned with said protuberances in said locked closed state.

6. Apparatus according to claim 5 wherein said plurality of tumbler rings comprises three tumbler rings.

7. A dial telephone lock for mounting in one opening of a telephone dial comprising a shaft having an elongate foot at one end dimensioned to be received in said opening, said foot having a larger dimension slightly greater than diameter of said opening, said shaft having a plurality of protuberances, a combination lock body having cylindrical end portion receivable in said opening for centering said shaft in said opening and a channel for receiving said shaft for axial movement, said lock body including a plurality of slots perpendicular to the axis of said shaft, a plurality of tumbler rings rotatably disposed in said slots, each of said tumbler rings having a notch positioned for alignment with said channel at a particular rotational position of said tumbler rings, said tumbler rings engaging said protuberances to inhibit axial movement of said shaft when said notches are misaligned with said channel.

8. Apparatus according to claim 7 further comprising at least one adapter ring having an inner diameter equal to the outer diameter of said cylindrical portion for varying the extent of the cylindrical portion able to enter said opening in said dial.

9. Apparatus according to claim 7 wherein said plurality of protuberances comprises three protuberances and said plurality of tumbler rings comprises three tumbler rings.

10. Apparatus according to claim 7 wherein each of said tumbler rings includes a projection for manual rotational manipulation and wherein said lock body includes a plurality of indicia disposed at varying rotational positions of said projections, whereby a particular indicia is associated with the rotational position of each tumbler ring at which said notch is aligned with said channel.

11. Apparatus according to claim 7 comprising a cylinder of C-shaped cross section disposed in said lock body defining said channel, said protuberances being disposed in the gap of the C-shape of said cylinder.

* * * * *